(No Model.) 5 Sheets—Sheet 3.

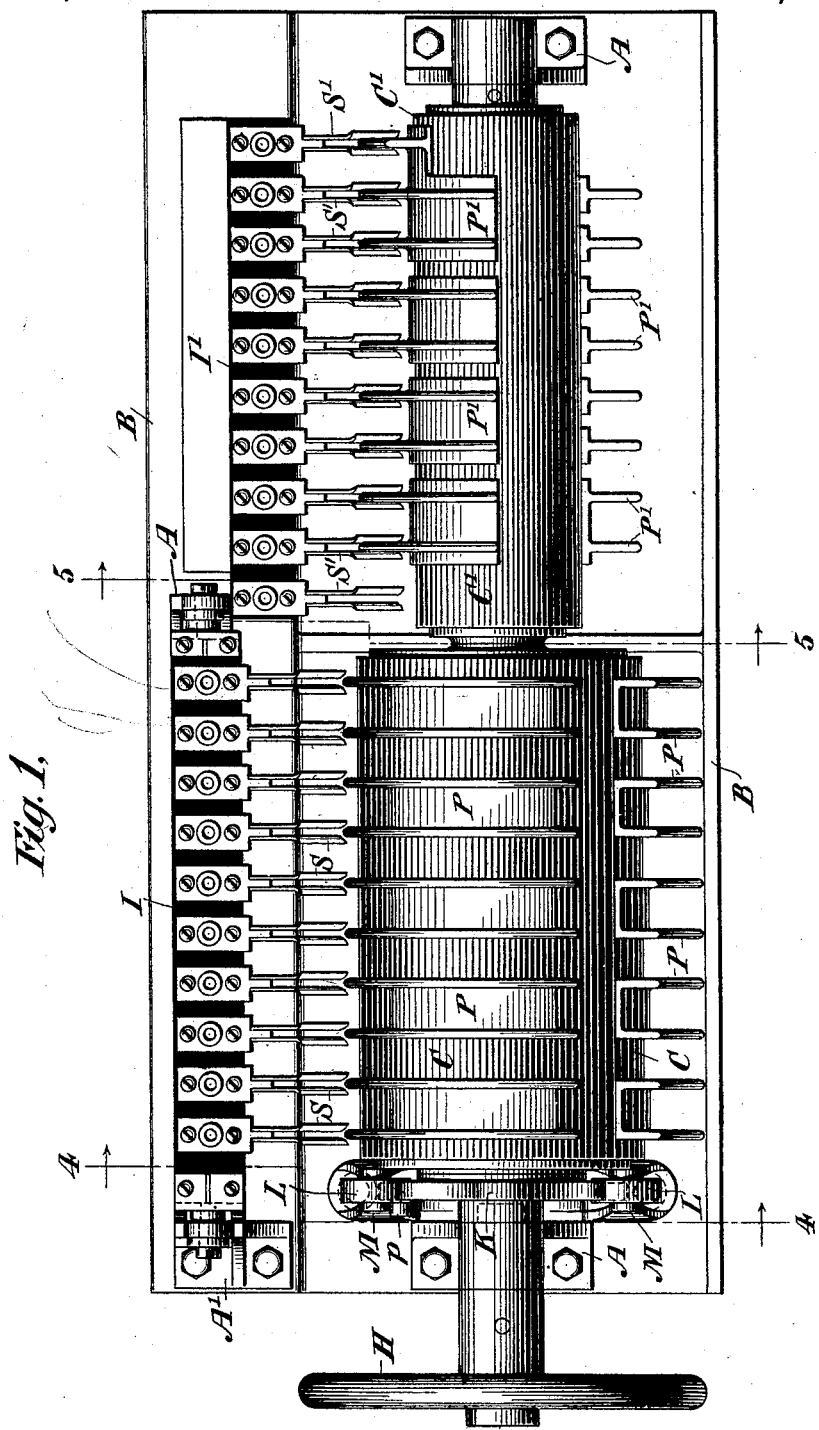

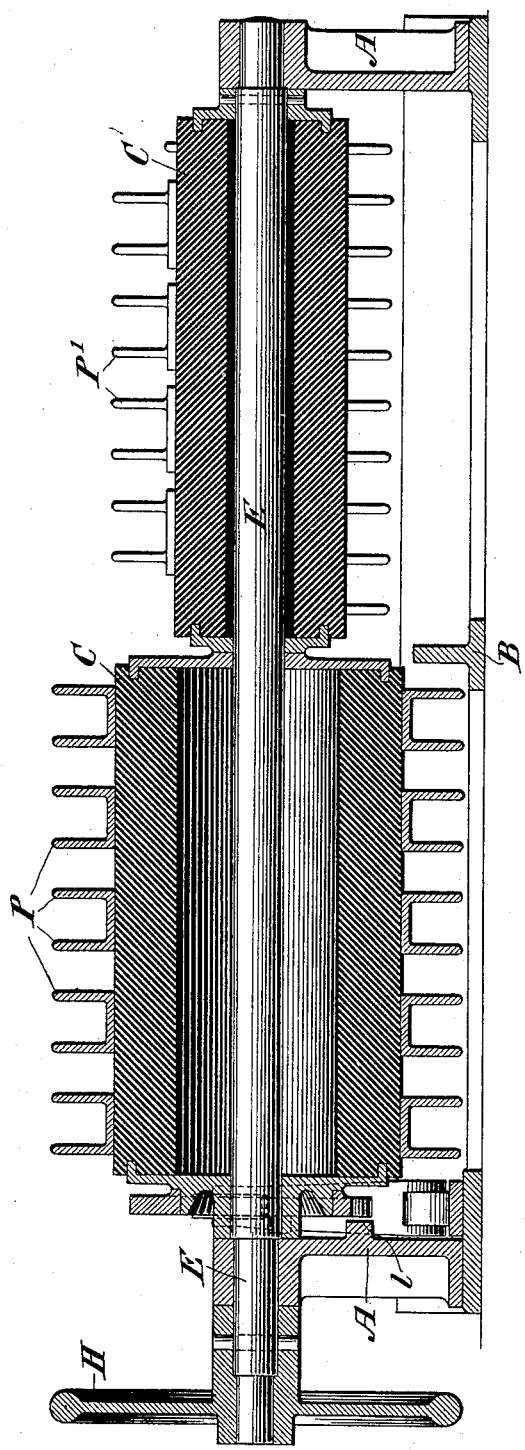

R. LUNDELL.
APPARATUS FOR CONTROLLING THE APPLICATION OF ELECTRICAL CURRENTS.

No. 507,144. Patented Oct. 24, 1893.

Witnesses
C. E. Ashley
H. W. Lloyd

Inventor
Robert Lundell
By his Attorney
Charles J. Kintner (No Model.)  5 Sheets—Sheet 4.
R. LUNDELL.
APPARATUS FOR CONTROLLING THE APPLICATION OF ELECTRICAL CURRENTS.
No. 507,144.  Patented Oct. 24, 1893.
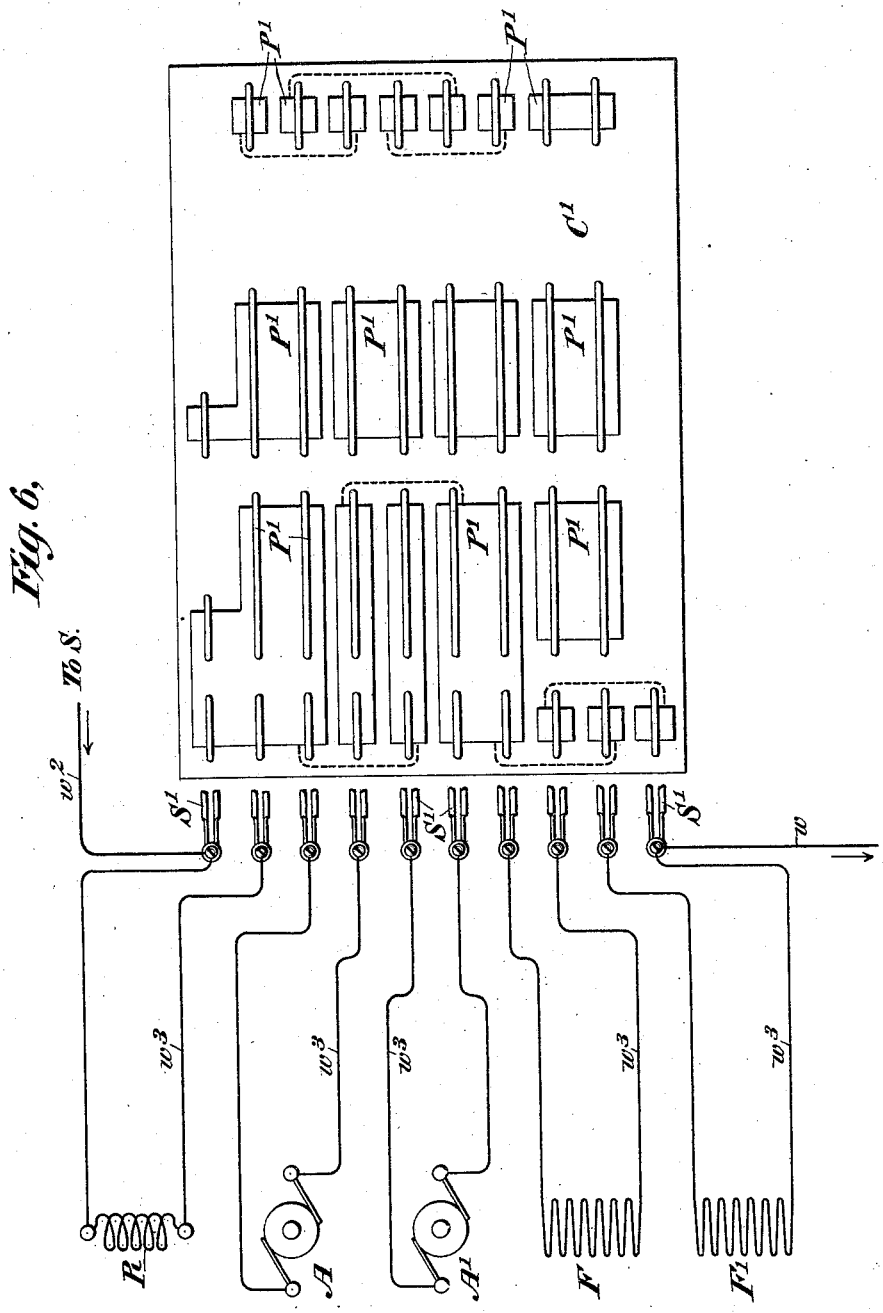

(No Model.) 5 Sheets—Sheet 5.

R. LUNDELL.
APPARATUS FOR CONTROLLING THE APPLICATION OF ELECTRICAL CURRENTS.

No. 507,144. Patented Oct. 24, 1893.

Witnesses
C. E. Ashley
H. W. Lloyd

Inventor
Robert Lundell
By his Attorney
Charles J. Kintner

UNITED STATES PATENT OFFICE.

ROBERT LUNDELL, OF BROOKLYN, ASSIGNOR OF TWO-THIRDS TO EDWARD H. JOHNSON, OF NEW YORK, N. Y.

APPARATUS FOR CONTROLLING THE APPLICATION OF ELECTRICAL CURRENTS.

SPECIFICATION forming part of Letters Patent No. 507,144, dated October 24, 1893.

Application filed April 4, 1893. Serial No. 469,042. (No model.)

*To all whom it may concern:*

Be it known that I, ROBERT LUNDELL, a citizen of the United States, residing at Brooklyn, in the county of Kings and State of New York, have made a new and useful Invention in Apparatus for Controlling the Application or Use of Electrical Currents of High Tension and Great Quantity, of which the following is a specification.

My invention is directed to apparatus for use in connection with electric motors, dynamo electric machines, or analogus electric translating devices and has an especial application in connection with electric motors used in the propulsion of railway cars or analogous vehicles and its objects are: first, to construct a switching device or apparatus which shall first rupture the circuit at one or more points and then effect certain changes in the circuits of an electric motor, after which the circuit is again restored at the point or points of rupture; second, to avoid as far as possible injury from abnormal arcing at the points of rupture of the circuit or circuits which supply the operating current; third, to construct a current controlling apparatus which shall permit various changes to be effected in the motor or translating device with the simplest possible arrangement of parts and with a view of securing certainty of action without damage to any part of the apparatus; fourth, the accomplishment of any and all results necessarily attributable to the apparatus hereinafter described. These objects are effected by the apparatus hereinafter disclosed, the essentially novel features of which are particularly pointed out in the claims at the end of this specification.

For a full and clear understanding of the invention reference is had to the following specification and accompanying drawings.

Figure 4:
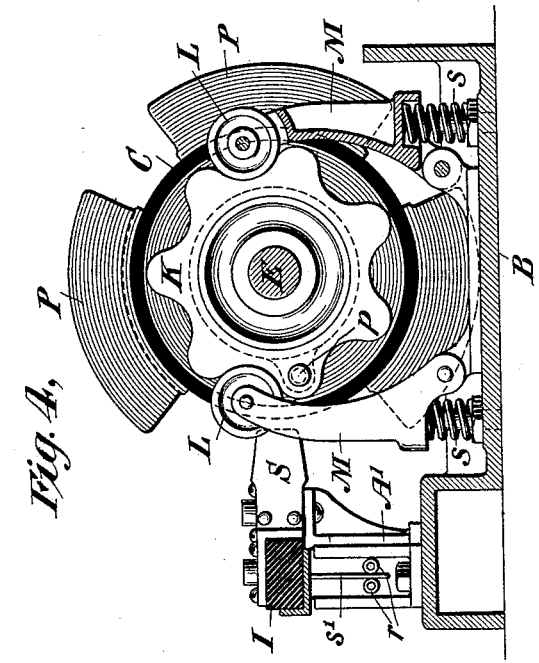
Figure 5:
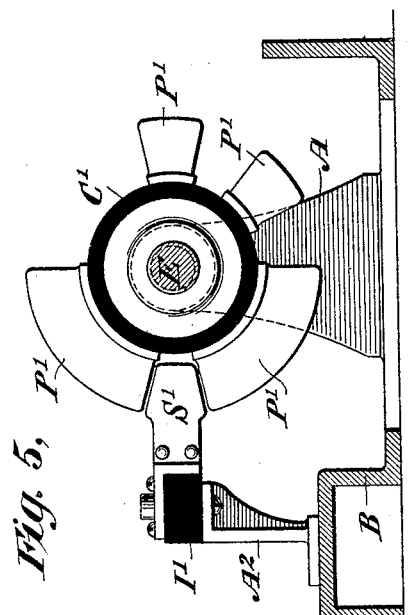
Figure 3:
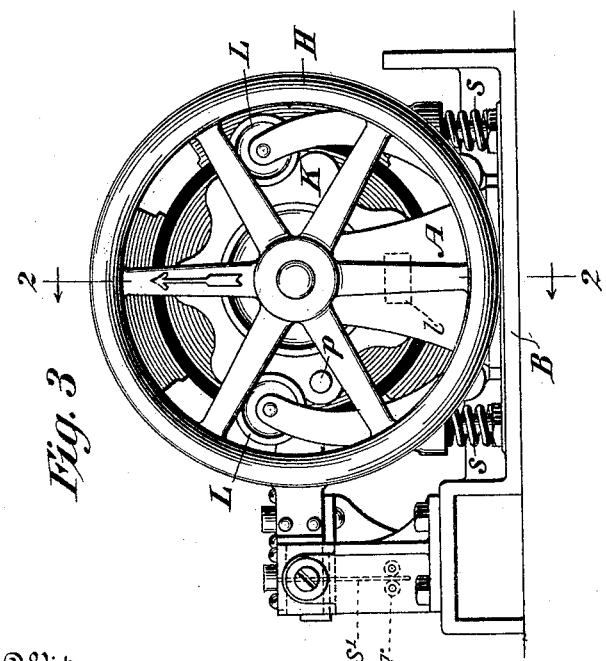
Figure 7:
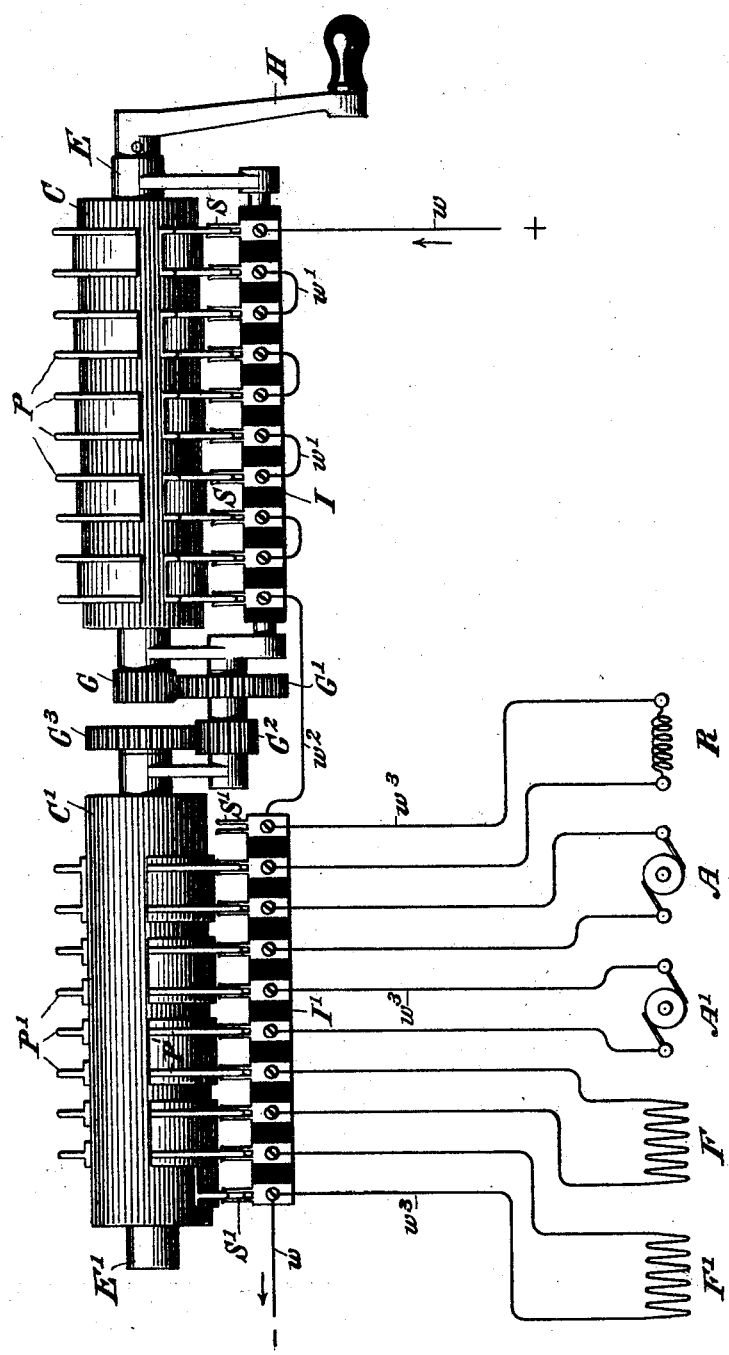

Figure 1 of the drawings is a plan view of my improved circuit controlling mechanism. Fig. 2 is a vertical longitudinal section thereof taken on the line 2—2, Fig. 3, and Fig. 3 is an end elevational view as seen looking at Figs. 1 and 2 from the left toward the right. Figs. 4 and 5 are transverse sectional views taken on the broken lines 4—4 and 5—5 respectively, Fig. 1, certain of the parts being shown in elevation and as seen looking from left to right in the direction of the arrows upon that figure. Fig. 6 is a diagrammatic view illustrating an electric motor having two armature circuits, two field magnet circuits, a rheostat and circuit connections together with a developed or plan view of the circuit controlling apparatus for varying the relative circuit connections of the several parts of the motor, and is not substantially different from the same parts shown in Fig. 1 of the drawings of a prior Patent, No. 486,213, granted to me on the 15th day of November, 1892, the same being illustrated here for the purpose of more fully disclosing the relation of the parts thereof to the current controlling apparatus which is designed to operate particularly with the type of apparatus disclosed in said prior patent. Fig. 7 is a side elevational view of a modified form of the present invention illustrating also the operative connections with the apparatus shown diagrammatically in Fig. 6 of the drawings.

Referring now to the drawings in detail and first to Figs. 1 and 2, B is the base or support of the entire apparatus and is provided at its opposite ends with upright standards A A in which are located journal bearings of an axle E which carries the rotary portions of the apparatus.

C and C' are cylinders of non-conducting material secured to the axle E by collars, as shown, and carrying on their exterior surfaces each several series of curved U shaped bridge pieces P P, P' P' of conducting material adapted to bridge the spaces electrically between adjacent pairs of contacting springs S, S', there being three series of these bridge pieces for the cylinder C and four series thereof for the cylinder C' as clearly shown in end elevational view in Figs. 4 and 5 respectively.

The cylinder C, Figs. 1 and 2, is of larger diameter than is the cylinder C' for the purpose of giving to the bridge pieces P a wider range of motion than is given to the corresponding bridge pieces P' for a purpose to be hereinafter described.

The contact plates S' are fixedly secured to an insulating bar I' which in turn is secured through standards $A^2$ to the base B of the machine, see Fig. 5, and the contact plates S are similarly secured to an insulating bar I, which is journaled in upright standards A' and is provided at its opposite ends with stiff leaf springs s', the lower or free ends of which pass between corresponding pairs of friction rollers r journaled in the standards, as clearly shown in Figs. 3 and 4, the arrangement being such that the several contact plates S are adapted to move a short distance in either direction under friction due to the bridge pieces P as the cylinder is rotated back and forth under the influence of an operating wheel H.

K, see Figs. 1, 3 and 4, is a corrugated wheel attached to the upper end of the axle E, and L L are friction rolls carried at the free ends of arms M M pivotally secured to the base B, said friction rolls being held in firm relation with the teeth of the wheel K by strong spiral springs s, the function of these parts being to maintain the apparatus in certain fixed positions as the handle H is rotated in either direction.

p is a stop pin carried by the wheel K and adapted to limit the rotation of the entire apparatus in either direction by coming in contact with a stop l on the under side of the standard A, see Figs. 2, 3 and 4.

In the modified form shown in Fig. 7, the two insulating cylinders C and C' are substantially of the same diameter and the increased velocity required for the cylinder C is obtained by gearing the two cylinders together through intermediate gear wheels G, G', G² and G³ journaled in supports carried by the base, the relative proportions of the gearing being such as to permit of the desired difference in speed. In this modified form instead of there being a single axis E there are two axes E and E', both of which are journaled to the frame in the same manner as was the axis E in Fig. 1.

The outer pair of contact springs S next to the wheel or handle H in both Figs. 1 and 7 is connected by a conductor w with the source of electrical energy supplying the necessary current, by say a trolley wire, and the succeeding pairs of such contact springs are connected by conductors w' w', the last pair thereof being connected by a conductor w² to the first pair of contact springs S' of that portion of the apparatus which effects the current changes in the motor or other translating device, the several independent parts thereof, namely, the rheostat R, the armatures A and A', the field magnets F and F' being connected directly to the several sets of contact springs S' by conductors w³, the last set of such contact springs being connected by the continuation of the conductor w to earth. See Fig. 7.

An examination of the diagram shown in Fig. 6 will illustrate the several current changes which take place in the rotation of the cylinder C' which is shown as developed in that figure and is fully described in my prior patent above referred to. It is also apparent that the arrangement of the bridge pieces P and P' with relation to their corresponding sets of contact springs S and S' is such that the circuit will always be interrupted between the plates P and the springs S during the time that any change is being effected between the bridge pieces P' and their contact springs S', no matter in which direction the wheel or handle H may be rotated and that this interruption is brought about at ten points by a snap action due to the stress of the leaf springs s' s' as the bridge pieces P pass between and out of frictional relation with the springs S.

In Fig. 2 I have shown the cylinder C which carries the bridge pieces P as of larger diameter than the cylinder C' which carries the bridge pieces P'. This arrangement is devised for the purpose of giving to the bridge pieces P movement always in advance of the bridge pieces P' so as to rupture the circuit before any change is effected in the motor circuits by the bridge pieces P' and their corresponding contact springs S', the object being to always disconnect the current supply before any current change is effected through the motor. This same variation of speed between the cylinders C and C' is effected in the modified form shown in Fig. 7 by giving to the intermediate gear wheels G, G', G² and G³ such relative proportions that the cylinder C will always travel faster than the cylinder C' when rotated in either direction.

This apparatus may be used in any place where current changes of the nature indicated are necessitated. It has an especial use however in connection with electrical street railway motors in which case the base B is secured to the dash-board of a car with the axle E arranged in a vertical position so that the hand-wheel or handle H is at the upper end and in a position of easy access for the motor-man.

I do not limit myself to the specific apparatus herein disclosed for effecting the objects sought.

I believe it is broadly new with me to combine a circuit interrupting device which interrupts the circuit of a current supply at a number of points simultaneously with a current changing device which effects certain relative changes in the circuits of the translating device during the time that the current is so interrupted and my claims are to be construed as generic in this particular.

Having thus described my invention, what I claim, and desire to secure by Letters Patent of the United States, is—

1. An electric motor having independent field and armature circuits and means for varying the circuit relation therethrough in any desired order, in combination with a circuit interrupting device provided with means for simultaneously interrupting the circuit at two or more independent points before each current change is effected and simultaneously restoring the circuit again after such change is effected substantially as described.

2. An electric motor provided with two or more armature circuits two or more field magnets and a circuit changing device for varying the current relations therethrough in any desired order, in combination with a circuit breaking device provided with means for interrupting the circuit at one or more points before each current change is effected and for restoring the circuit connections after such change is effected substantially as described.

3. The described method of effecting current changes to suit the requirements of a translating device which consists in first interrupting the current supply at a number of independent points, then establishing the current changes through the translating device at independent points and again restoring the current at the points where it is interrupted.

4. The described method of controlling an electric motor having two or more armature circuits and two or more field magnets consisting in first interrupting the circuit, then effecting the desired change in the circuit relations of the aforesaid field and armature coils and again re-establishing the circuit after these changes have been brought about.

5. An apparatus for controlling the application of electrical currents to a translating device consisting of two sets of movable contacting parts and two sets of fixed contacts one of which sets is connected to independent circuits for varying the current relation through independent parts of the translating device and the other carried by and provided with means adapted to suddenly rupture the circuit, whereby the current is first ruptured at several independent points and the circuit changes afterward effected through the translating device substantially as described.

6. A circuit controlling device consisting of two sets of movable contacts adapted to move at different speeds, two sets of fixed contacts adapted to contact with the movable contacts, one of said sets of fixed contacts being attached to a translating device, as an electric motor, and the other to a source of current supply substantially as described.

7. A circuit controlling device consisting of two sets of bridging contacts carried by independent cylinders; a set of fixed contacts lying in the path of one set of bridging contacts and operatively connected to an electric motor; a second set of fixed contacts lying in the path of the other set of bridging contacts and carried by a rocking bar provided with means for causing said fixed contacts to suddenly rupture the circuit at a number of points when the bridging contacts are moved from under them substantially as described.

8. A circuit interrupting device or switch consisting of one or more series of bridging contacts carried by a rotary drum and lying in the path of corresponding pairs of yielding contact springs carried by a rocking bar provided with means for causing a sudden rupture of the circuits between the bridging contacts and said springs as the drum is rotated substantially as described.

9. An electric motor having independent field and armature circuits, a circuit changing device having circuit connections for varying the circuit relations through the field and armature circuits in any desired order, in combination with a circuit interrupting device having two or more series of bridging contacts and a single series of stationary contacts carried by a shaft and provided with means for causing the stationary contacts to suddenly rupture the circuit before each current change is effected through the motor and to again re-establish the circuit after such change is effected substantially as described.

In testimony whereof I have hereunto subscribed my name this 1st day of April, 1893.

ROBERT LUNDELL.

Witnesses:
C. J. KINTNER,
M. M. ROBINSON.